United States Patent Office 3,185,695
Patented May 25, 1965

3,185,695
6-METHYL- and 1,6-DIMETHYL-ERGOLINE II DERIVATIVES
Luigi Bernardi, Onofrio Goffredo, and Germano Bosisio, Milan, Italy, assignors to Societá Farmaceutici Italia, Milan, Italy, a corporation of Italy
No Drawing. Filed Nov. 13, 1962, Ser. No. 237,367
Claims priority, application Italy, Nov. 28, 1961, 21,387/61
4 Claims. (Cl. 260—285.5)

Our invention relates to a new class of 6-methyl- and 1,6-dimethyl-ergoline II derivatives which are pharmacologically useful. Our copending application Serial No. 237,344 of even date herewith describes among other things ergoline II derivatives having the following structural formula:

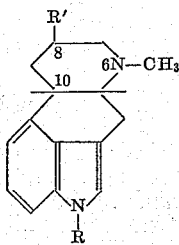

wherein
R is hydrogen or methyl,
R' is $CONH_2$ or $CH_2NHR''$, and
R'' is a hydrogen atom or an acrylate radical derived from an aliphatic, cycloaliphatic, aromatic or heterocyclic carboxylic acid having from 1 to 10 carbon atoms.

Our copending application Serial No. 237,369 of even date herewith describes among other things ergoline II derivatives having the above general formula wherein:

R is hydrogen or methyl,
R' is $—CON_3$ or

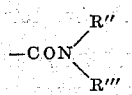

R'' is a hydrogen atom or an alkyl radical (or hydroxyalkyl) having from 1 to 4 carbon atoms,
R''' is an alkyl radical (or hydroxyalkyl) having from 1 to 4 carbon atoms, and
R'' and R''' may be part of a heterocyclic ring having 1 to 2 hetero-atoms.

Our present invention has as its object a new class of 6-methyl- and 1,6-dimethyl-ergoline II having the formula:

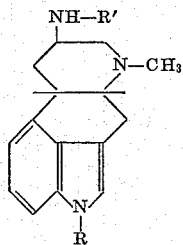

wherein
R is hydrogen or methyl,
R' is hydrogen or a radical of an aliphatic, cycloaliphatic, aromatic or heterocyclic acid having from 1 to 10 carbon atoms.

The process of our invention consists in transforming the dihydro-lysergic acid II azide or its 1-methyl derivative prepared according to the process described in the latter of our above-mentioned applications, into the corresponding amine which may be isolated as such or converted into an acyl derivative in known manner.

The process of the invention may be illustrated by the following scheme:

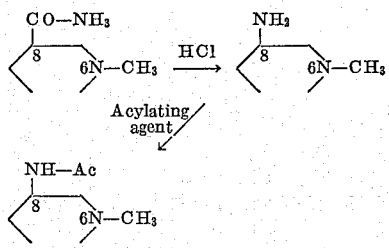

wherein Ac is an acylate radical derived from an aliphatic, cycloaliphatic, aromatic or heterocyclic carboxylic acid having from 1 to 10 carbon atoms.

The dihydro-lysergic acid II hydrazide (or the 1-methyl-dihydro-lysergic acid II hydrazide) starting material for the process of the invention may be any lysergic acid isomers in D- or L-form or the racemic mixture.

The process of the invention, in greater detail, may be carried out as follows: The starting material is dissolved in an inorganic acid, preferably diluted hydrochloric acid, and is reacted with sodium nitrite and afterwards with an inorganic acid at low temperature, preferably at about 0° C., and finally the reaction mixture is heated up to 100° C.

The azide obtained in the first phase, is submitted to the Curtius degradation, preferably with hydrochloric acid, and the corresponding amine is isolated from the reaction product by extraction with a water-immiscible solvent, preferably a halogenated hydrocarbon solvent, e.g. methylene dichloride or chloroform. After evaporation of the solvent, the residue consisting of crude 6-methyl- or 1,6-dimethyl-8β-amino-ergoline II is purified by crystallization from an organic solvent.

The acyl derivatives of this amine are prepared by reacting the crude residue with a halide or anhydride of an aliphatic, cycloaliphatic, aromatic or heterocyclic carboxylic acid having from 1 to 10 carbon atoms, optionally in the presence of a tertiary amine, such as pyridine, its homologues, or dimethyl-aniline.

Typical examples of acyl derivatives, according to the invention, are the derivatives of the following acids: acetic, propionic, butyric, valerianic, hexanoic, heptanoic, octanoic, decanoic, cyclopentanecarboxylic, cyclopentyl-propionic, succinic, benzoic, 2,6-dimethoxy-benzoic, 3,4,5-trimethoxy-benzoic phenyl-propionic, phenoxyacetic, α-phenoxy-propionic, ethyl-carbamic and nicotinic.

The products of the invention are crystalline, colorless or yellow solids, soluble in the usual organic solvents and in acids. They show a good pharmacological activity and particularly they have proved to be useful as oxytocic, antienteraminic, adrenolytic, hypotensive and sedative drugs.

The following examples serve to illustrate, but not to limit, the invention.

EXAMPLE 1

*6-methyl-8β-amino-ergoline II*

1.2 g. of dihydro-D-lysergic acid II hydrazide, prepared as described in the latter of our above-mentioned copending applications (237,369), in the first part of Example 1 [melting point 262–264° C. (with decomposition); $[\alpha]_D^{20} = +37$ (c.=0.32 in pyridine)] are dissolved in 43 cc. of 0.1 N hydrochloric acid. 43 cc. of 0.1 N sodium nitrite solution are added to the mixture, the temperature is adjusted to 0° C., cooling with a refrigerating mixture, and gradually (keeping the mixture under vigorous stirring) 37 cc. of 0.2 N hydrochloric acid are added by dropwise addition. The temperature is kept at 0° C. for 5 minutes, 52 cc. of 0.2 N hydrochloric acid are added and with an oil bath previously heated, the internal temperature is brought as rapidly as possible to 100° C., and kept at this value for 3 minutes. The mixture is cooled and made alkaline with 10% sodium carbonate solution and extracted with chloroform. The chloroform extract is evaporated in vacuo. 0.960 g. of 6-methyl-8β-amino-ergoline II are obtained as an amorphous residue.

EXAMPLE 2

*6-methyl-8β-acetylamino-ergoline II*

The preparation is carried out in the same way as in Example 1. 0.960 g. of the residue is taken up with 6.3 cc. of anhydrous pyridine. The red-orange solution is cooled to —10° C. with a refrigerating mixture and under stirring 0.63 cc. of acetyl chloride is added. The solution is kept at —10° C. for a further 10 minutes and afterwards at room temperature for 20 minutes. The mixture is diluted with chloroform, a small amount of methanol is added, the mixture is poured into a separating funnel containing ice-water, made alkaline with a dilute solution of sodium hydroxide, shaken, and the two layers are separated. The aqueous layer is extracted several times with chloroform. The combined chloroform extracts are washed with water, dried over anhydrous sodium sulfate and evaporated to dryness in vacuo. The solid residue is dissolved in warm acetone, decolorized with charcoal and concentrated to a small volume. 0.660 g. of 6-methyl-8β-acetylamino-ergoline II crystallizes in two crops; melting point 277–278° C. with decomposition; $[\alpha]_D^{20} = +42°$ (c.=0.26 in pyridine).

EXAMPLE 3

*6-methyl-8β-benzoyl-amino-ergoline II*

The preparation is carried out in the same way as in Example 2, but employing benzoyl chloride in lieu of acetyl chloride. 6-methyl-8β-benzoyl-amino-ergoline II, melting at 268–270° C. with decomposition;

$$[\alpha]_D^{20} = +144°$$

(c.=0.21 in pyridine) are obtained.

EXAMPLE 4

*6-methyl-8β-ethoxy-carbamido-ergoline II*

The preparation is carried out in the same way as in Example 2, but employing ethyl chloro-carbonate in lieu of acetyl chloride. 6-methyl-8β-ethoxy-carbamido-ergoline II is obtained; melting point 220–221° C. with decomposition; $[\alpha]_D^{20} = +55°$ (c.=0.21 in pyridine).

We claim:
1. 6-methyl-8β-acetylamino-ergoline II.
2. 6-methyl-8β-benzoyl-amino-ergoline II.
3. 6-methyl-8β-ethoxy-carbamido-ergoline II.
4. An ergoline II compound of the formula:

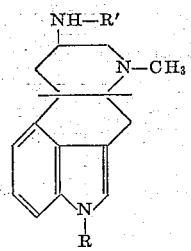

wherein
R is selected from the group consisting of hydrogen and methyl; and
R' is selected from an acyl group consisting of
 (a) substituted and unsubstituted saturated aliphatic acids, with up to 10 carbon atoms, wherein the substituent is from the group consisting of phenyl and phenoxy;
 (b) saturated cycloaliphatic acids with up to 8 carbon atoms, wherein the cycloaliphatic ring has 5 carbon atoms;
 (c) substituted and unsubstituted benzoic acid, wherein the substituent is methoxy; and
 (d) nicotinic acid.

References Cited by the Examiner

Burger: Medicinal Chemistry, 2d ed., pp. 585–6 and 622 (1960).
Hoffman, Helv. Chim. Octa, vol. 30, pp. 44–51 (1947).
Zikan et al.: Collection Czek. Chem. Comm., vol. 25, pp. 1922–28 (1960).
Stoll et al.: Helv. Chim. Acta, vol. 36, pp. 1512–1526.

IRVING MARCUS, *Primary Examiner.*

NICHOLAS S. RIZZO, WALTER A. MODANCE,
*Examiners.*